(12) United States Patent
Hernandez

(10) Patent No.: US 9,866,335 B2
(45) Date of Patent: Jan. 9, 2018

(54) TESTING CIRCUIT WITH DIRECTIONAL COUPLER

(71) Applicant: SKYWORKS SOLUTIONS, INC., Woburn, MA (US)

(72) Inventor: Zelman Hernandez, Imperial, CA (US)

(73) Assignee: Skyworks Solutions, Inc., Woburn, MA (US)

(*) Notice: Subject to any disclaimer, the term of this patent is extended or adjusted under 35 U.S.C. 154(b) by 0 days.

(21) Appl. No.: 15/083,022

(22) Filed: Mar. 28, 2016

(65) Prior Publication Data

US 2016/0323045 A1 Nov. 3, 2016

Related U.S. Application Data

(60) Provisional application No. 62/140,780, filed on Mar. 31, 2015.

(51) Int. Cl.
*H04B 17/00* (2015.01)
*H04B 17/10* (2015.01)

(52) U.S. Cl.
CPC ................ *H04B 17/104* (2015.01)

(58) Field of Classification Search
CPC ...... H04B 1/0475; H04B 1/0057; H04B 1/18; H04B 1/48; H04B 1/525; H04B 15/04; H04B 1/04; H04B 1/0458

USPC ......................................................... 455/67.1
See application file for complete search history.

(56) References Cited

U.S. PATENT DOCUMENTS

| | | | |
|---|---|---|---|
| 6,904,078 B1* | 6/2005 | Abeta | H04B 1/707 375/141 |
| 2002/0094791 A1* | 7/2002 | Pehlke | H03F 1/0272 455/127.1 |
| 2007/0176688 A1* | 8/2007 | Frei | H03F 1/52 330/302 |
| 2010/0283665 A1* | 11/2010 | Bashir | H04B 15/02 342/174 |

* cited by examiner

*Primary Examiner* — Ajibola Akinyemi
(74) *Attorney, Agent, or Firm* — Chang & Hale LLP

(57) ABSTRACT

Testing circuit with directional coupler. A testing circuit can include a testing circuit input configured to receive an output signal from a module, the output signal having a fundamental component and a harmonic component. The testing circuit can further include a testing circuit fundamental output configured to output the fundamental component and a testing circuit harmonic output configured to output the harmonic component. The testing circuit can include a first directional coupler having a first coupler input coupled to the testing circuit input, a first transmitted output coupled to the testing circuit fundamental output, and a first coupled output coupled to the testing circuit harmonic output.

20 Claims, 6 Drawing Sheets

TESTING CIRCUIT WITH DIRECTIONAL COUPLER

CROSS-REFERENCE TO RELATED APPLICATION(S)

This application claims priority to U.S. Provisional Application No. 62/140,780 filed Mar. 31, 2015, entitled TESTING CIRCUIT WITH DIRECTIONAL COUPLER, the disclosure of which is hereby expressly incorporated by reference herein in its entirety.

BACKGROUND

Field

The present disclosure generally relates to testing circuits.

Description of the Related Art

A radio-frequency (RF) power amplification module may receive an input signal and produce an output signal as an amplified (and/or filtered) version of the input signal. Because of nonlinearities in the components of the RF power amplification module, the RF power amplification module may, in response to an input signal at a fundamental frequency, produce an output signal having energy at harmonics of the fundamental frequency. Measuring these harmonics in a test environment may be difficult due to the relative weakness of the signal at the harmonic frequencies.

SUMMARY

In accordance with some implementations, the present disclosure relates to a testing circuit. The testing circuit includes a testing circuit input configured to receive an output signal from a module, the output signal having a fundamental component and a harmonic component. The testing circuit further includes a testing circuit fundamental output configured to output the fundamental component. The testing circuit further includes a testing circuit harmonic output configured to output the harmonic component. The testing circuit includes a first directional coupler having a first coupler input coupled to the testing circuit input, a first transmitted output coupled to the testing circuit fundamental output, and a first coupled output coupled to the testing circuit harmonic output.

In some embodiments, the testing circuit can further include a first filter coupled between the first coupled output and the testing circuit harmonic output. The first filter can be configured to bandpass filter the harmonic component for a first type of the output signal. In some embodiments, the first type of the output signal can be a GSM (Global System for Mobile Communications) signal.

In some embodiments, the testing circuit can further include a second directional coupler having a second coupler input coupled to the testing circuit input, a second transmitted output coupled to the testing circuit fundamental output, and a second coupled output coupled to the testing circuit harmonic output. In some embodiments, the testing circuit can further include a switch having a first switching input coupled to the first coupled output, a second switching input coupled to the second coupled output, and a switching output coupled to the testing circuit harmonic output. In some embodiments, the testing circuit can further include a second filter coupled between the second coupled output and the testing circuit harmonic output. The second filter can be configured to bandpass filter the harmonic component for a second type of the output signal. In some embodiments, the second type of the output signal can be a DCS (Digital Cellular Service) signal.

In some embodiments, the first directional coupler can include a portion of a first trace and a portion of second trace. The first trace can couple the testing circuit input to the testing circuit fundamental output and the portion of the second trace can be disposed adjacent and parallel to the portion of the first trace. In some embodiments, the first trace and the second trace can be disposed on a printed circuit board.

In some embodiments, the testing circuit can further include a first transmission signal input configured to provide a first transmission input signal to a first transmission input of the module. In some embodiments, the testing circuit can further include a second transmission signal input configured to provide a second transmission input signal to a second transmission input of the module. In some embodiments, the testing circuit can include a switch having a first switching output coupled to the first transmission signal input and a second switching output coupled to the second transmission signal input.

In some embodiments, the testing circuit can further include an insertion loss output configured to output an insertion loss output signal in response to an insertion loss input applied to the testing circuit fundamental output.

In some implementations, the present disclosure relates to a testing unit including a printed circuit board and a testing circuit implemented on the printed circuit board. The testing circuit includes a testing circuit input configured to receive an output signal from a radio-frequency (RF) module, the output signal having a fundamental component and a harmonic component. The testing circuit further includes a testing circuit fundamental output configured to output the fundamental component. The testing circuit further includes a testing circuit harmonic output configured to output the harmonic component. The testing circuit includes a first directional coupler having a first coupler input coupled to the testing circuit input, a first transmitted output coupled to the testing circuit fundamental output, and a first coupled output coupled to the testing circuit harmonic output.

In some embodiments, the RF module can be a front-end module (FEM).

In some embodiments, the testing circuit can further include a second directional coupler having a second coupled input coupled to the testing circuit input, a second transmitted output coupled to the testing circuit fundamental output, and a second coupled output coupled to the testing circuit harmonic output. In some embodiments, the testing circuit can further include a switch having a first switching input coupled to the first coupled port, a second switching input coupled to the second coupled port, and a switching output coupled to the testing circuit harmonic output.

In some embodiments, the testing unit can further include a second testing circuit implemented on the PCB. The second testing circuit can include a second testing circuit input configured to receive a second output signal from a second module, the second output signal having a second fundamental component and a second harmonic component. The second testing circuit can further include a second testing circuit fundamental output configured to output the second fundamental component. The second testing circuit can further include a second testing circuit harmonic output configured to output the second harmonic component. The second testing circuit can include a second directional coupler having a second coupler input coupled to the second testing circuit input, a second transmitted output coupled to the second testing circuit fundamental output, and a second coupled output coupled to the second circuit harmonic output.

In some implementations, the present disclosure relates to a method of testing a radio-frequency (RF) module. The method includes coupling the RF module to a testing unit. The method further includes applying a transmission test input signal to an input of the testing unit. The method further includes receiving a transmission test fundamental output signal at a first output of the testing unit. The method further includes receiving a transmission test harmonic output signal from a second output of the testing unit via a directional coupler of the testing unit.

In some embodiments, the method can further include applying a reception test input signal to the first output of the testing unit and receiving a reception test output signal from an insertion loss output of the testing unit.

In some embodiments, the method can further include applying a second transmission test input signal to the input of the testing unit. The transmission test input signal can be a GSM signal and the second transmission test input signal can be a DCS signal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

A radio-frequency (RF) module may receive an input signal and produce an output signal based on the input signal. For example, the RF module may receive a transmission input signal intended for transmission via an antenna and produce a transmission output signal to be transmitted via the antenna. As another example, the RF module may receive a reception input signal (e.g., from an antenna or another source) and produce a reception output signal.

The RF module may include power amplifiers, filters, match components, band select switches and other components. The output signal may be an amplified and/or filtered version of the input signal. Because of nonlinearities in the components of the RF module, the RF module may, in response to an input signal at a fundamental frequency, produce an output signal having energy at harmonics of the fundamental frequency. Measuring these harmonics in a test environment may be difficult due to the relative weakness of the signal at the harmonic frequencies. For example, at an output port of a testing unit that outputs the output signal of the RF module, the energy at the harmonic frequencies may be below a noise level.

Disclosed herein are various examples of circuits, devices and methods that can be configured to, among others, address the foregoing challenges associated with testing RF modules. In some implementations as described herein, a testing circuit includes a directional coupler that couples the harmonics of the output signal to a harmonic output port separate from a fundamental output port that outputs the output signal of the RF module.

Figure 1:
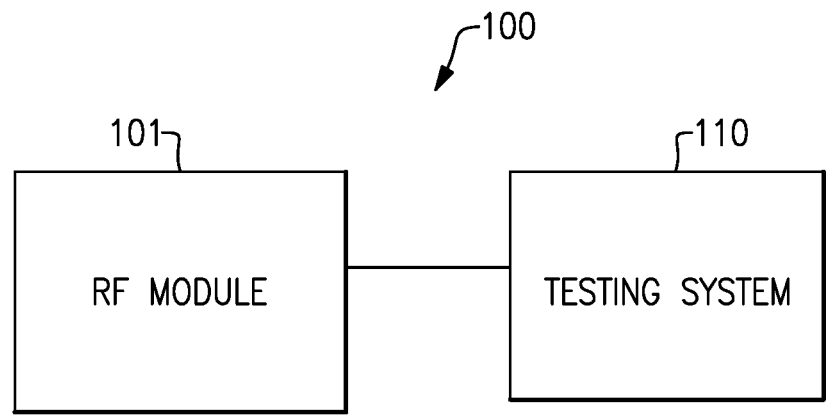
FIG. 1 shows an example of a testing configuration that includes an RF module being tested by a testing system.

FIG. 1 shows an example of a testing configuration 100 that includes an RF module 101 being tested by a testing system 110. The RF module 101 is coupled to and controlled by the testing system 110. The testing system 110 may provide input signals to the RF module 101 and receive corresponding output signals from the RF module 101 in response. The testing system 110 may also provide power to RF module 101 or place the RF module 101 in various states. For example, the testing system 110 may configure the RF module 101 to amplify a GSM (Global System for Mobile Communications) signal, provide an input signal to the RF module 101 in a GSM frequency band, and measure an output signal from the RF module 101. As another example, the testing system 110 may configure the RF module 101 to amplify a DCS (Digital Cellular Service) signal, provide an input signal to the RF module 101 in a DCS frequency band, and measure an output signal from the RF module 101.

Figure 2:
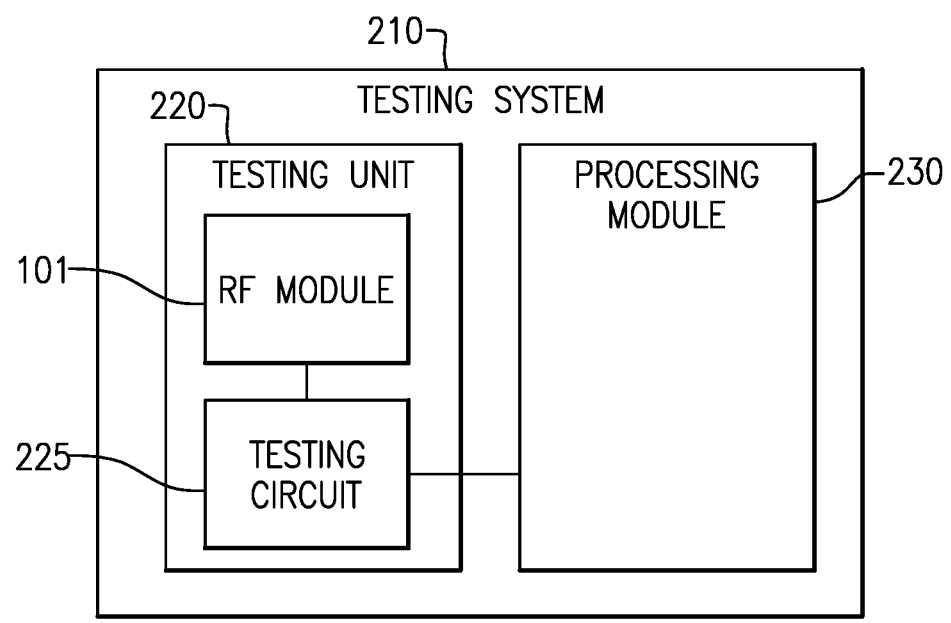
FIG. 2 shows an example of a testing system including a testing unit coupled to a processing module.

FIG. 2 shows an example of a testing system 210 including a testing unit 220 coupled to a processing module 230. An RF module 101 to be tested (referred to as a module-under-test or device-under-test) may be coupled to the testing unit 220 in a number of ways. In one embodiment, the RF module 101 is disposed within or inserted into a dock of the testing unit 220. The testing unit 220 includes a testing circuit 225 that couples the RF module 101 (when coupled to the testing unit 225) to the processing module 230. In one embodiment, the testing unit 220 includes a printed circuit board (PCB) and the testing circuit 225 is implemented on the PCB. The testing circuit 225 may be implemented on the PCB through the use of conductive traces and SMT (surface-mount technology) components. The testing circuit 225 may further include input ports and/or output ports for attaching cables that couple the testing circuit 225 to the processing module 230.

The processing module 230 may generate input signals to be fed to the testing unit 220 and may receive output signals from the testing unit 220. The input signals to the testing unit 220 may be fed by the testing unit 220 to the RF module 101 (e.g., via the testing circuit 225). The corresponding output signals from the RF module 101 may, in turn, be fed by the testing unit 220 back to the processing module 230. The output signals of the RF module 101 may be filtered or otherwise modified by the testing unit 220 before being fed back to the processing module 230.

The processing module 230 may process the received signals to determine various characteristics of the RF module 101. For example, the processing module 230 may determine that the RF module 101 meets or fails to meet particular standards. The standards may be, among other things, quality control standards or governmental regulations.

Figure 3:
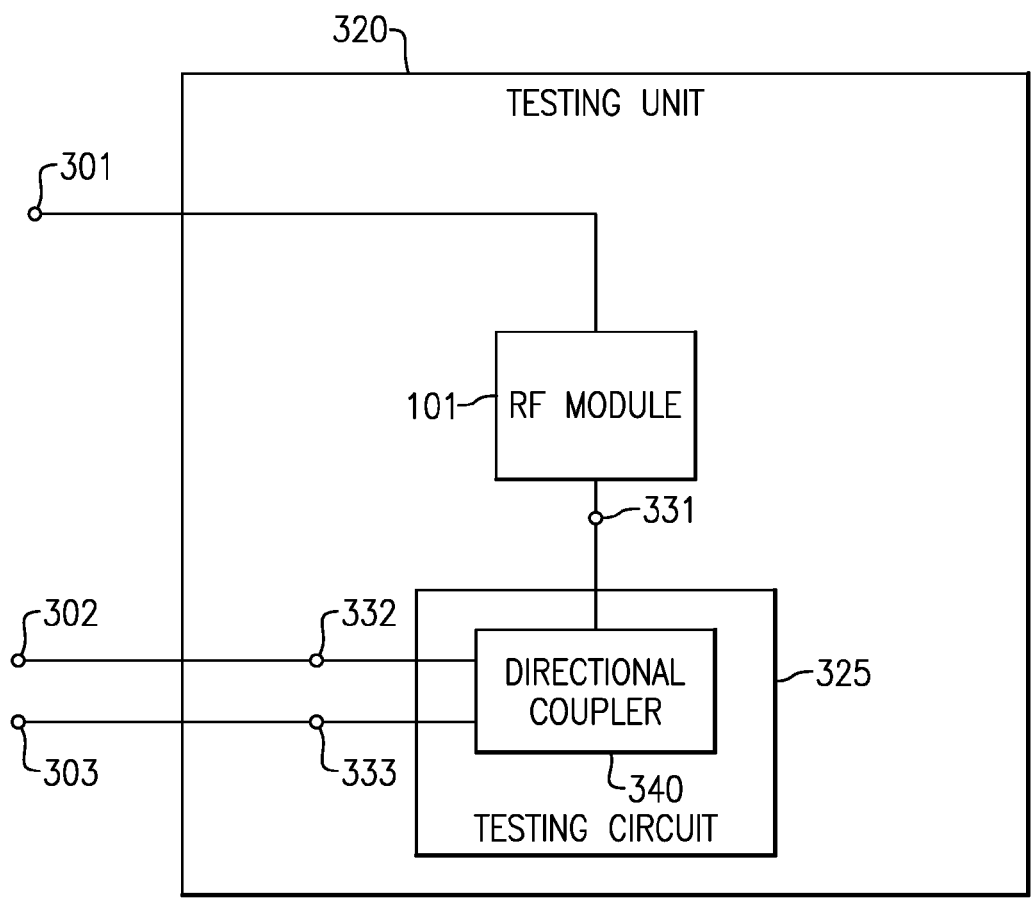
FIG. 3 shows an example of a testing unit including a directional coupler.

FIG. 3 shows an example of a testing unit 320 including a directional coupler 340. The testing unit 320 has a testing unit input 301, a testing unit fundamental output 302, and a testing unit harmonic output 303. The testing unit input 301 and testing unit outputs 302, 303 may include ports for connecting cables to the testing unit 320. The testing unit input 301 is configured to receive a testing unit input signal. The testing unit input signal may be, for example, a GSM signal or a DCS signal.

The testing unit input signal is fed to an input of the RF module 101 as an RF module input signal. In response, the RF module 101 produces an RF module output signal at an output of the RF module 101. Whereas the RF module input signal may be limited to a particular frequency band, e.g., a GSM frequency band or a DCS frequency band, the RF module output signal may include a fundamental component (at the particular frequency band) and a harmonic component (at higher frequencies).

The RF module output signal is fed to a testing circuit 325 including a directional coupler 340. The directional coupler 340 has a coupler input, a transmitted output which outputs a signal received at the coupler input, and a coupled output which outputs a filtered version of the signal received at the coupler input.

In particular, the RF module output signal is fed to a testing circuit input 331 of the testing circuit 325 which is coupled to the coupler input of the directional coupler 340. The transmitted output of the directional coupler 340 is coupled to a testing circuit fundamental output 332 which is, in turn, coupled to the testing unit fundamental output 302. The coupled output of the directional coupler 340 is coupled to a testing circuit harmonic output 333 which is, in turn, coupled to the testing unit harmonic output 303.

Thus, the testing circuit 325 includes a testing circuit input 331 configured to receive an output signal from a module, the output signal having a fundamental component and a harmonic component. The testing circuit 325 further includes a testing circuit fundamental output 332 configured to output the fundamental component and a testing circuit harmonic output 333 configured to output the harmonic component. The testing circuit 325 further includes a directional coupler having a coupler input coupled to the testing circuit input 331, a transmitted output coupled to the testing circuit fundamental output 332, and a coupled output coupled to the testing circuit harmonic output 333.

The testing circuit fundamental output 332, in additional to outputting the fundamental component, may output the harmonic component. Because of the relative strength of the fundamental component to the harmonic component, the harmonic component output from the testing circuit fundamental output 332 may be ignored in many testing applications. Similarly, the testing circuit harmonic output 333 may weakly output the fundamental component due to partial coupling of the fundamental component by the directional coupler 340 or incomplete filtering of the fundamental component (as described below).

Figure 4:
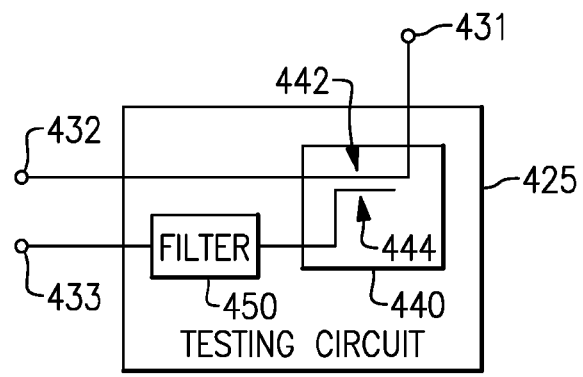
FIG. 4 shows an example of a testing circuit including a filter.

FIG. 4 shows an example of a testing circuit 425 including a filter 450. The testing circuit 425 includes a testing circuit input 431 that receives a testing circuit input signal from an RF module being tested. The testing circuit input signal may include a fundamental component and a harmonic component. The testing circuit input signal is fed to the coupler input of the directional coupler 440. The directional coupler 440 includes, in addition to the coupler input, a transmitted output that outputs the testing circuit input signal and a coupled output that outputs a filtered version of the testing circuit input signal.

The directional coupler 440 includes a portion of a first trace 442 and a portion of a second trace 444. The first trace 442 couples the testing circuit input 431 to a testing circuit fundamental output 432. The portion of the second trace 444 is disposed adjacent and substantially parallel to the portion of the first trace 442. Thus, some of the electromagnetic power (e.g., in the testing circuit input signal) carried by the first trace 442 is coupled to the second trace 444. The amount of power coupled to the second trace 444 from the first trace 442 may be determined by the length of the second trace 444 and the distance between the second trace 444 and the first trace 442. Further, the amount of power coupled to the second trace 444 from the first trace 442 may vary as a function of frequency.

Thus, with appropriate dimensions for the second trace 444, the directional coupler 440 may act as filter that couples the harmonic component of the testing circuit input signal more strongly than the fundamental component. However, because the fundamental component may be significantly stronger than the harmonic component, additional filtering may be desirable. Thus, the testing circuit 425 may include a filter 450 disposed between the coupled output of the directional coupler 440 and the testing circuit harmonic output 433. The filter 450 may be configured to bandpass filter the harmonic component of the testing circuit input signal to produce a testing circuit harmonic output signal. In one implementation, a filter may also be placed between the transmitted output of the directional coupler 440 and the testing circuit fundamental output 432 to bandpass filter the fundamental component of the testing circuit input signal. However, due to the relative strengths of the fundamental component and the harmonic component, such a filter may be omitted in many implementations.

Figure 5:
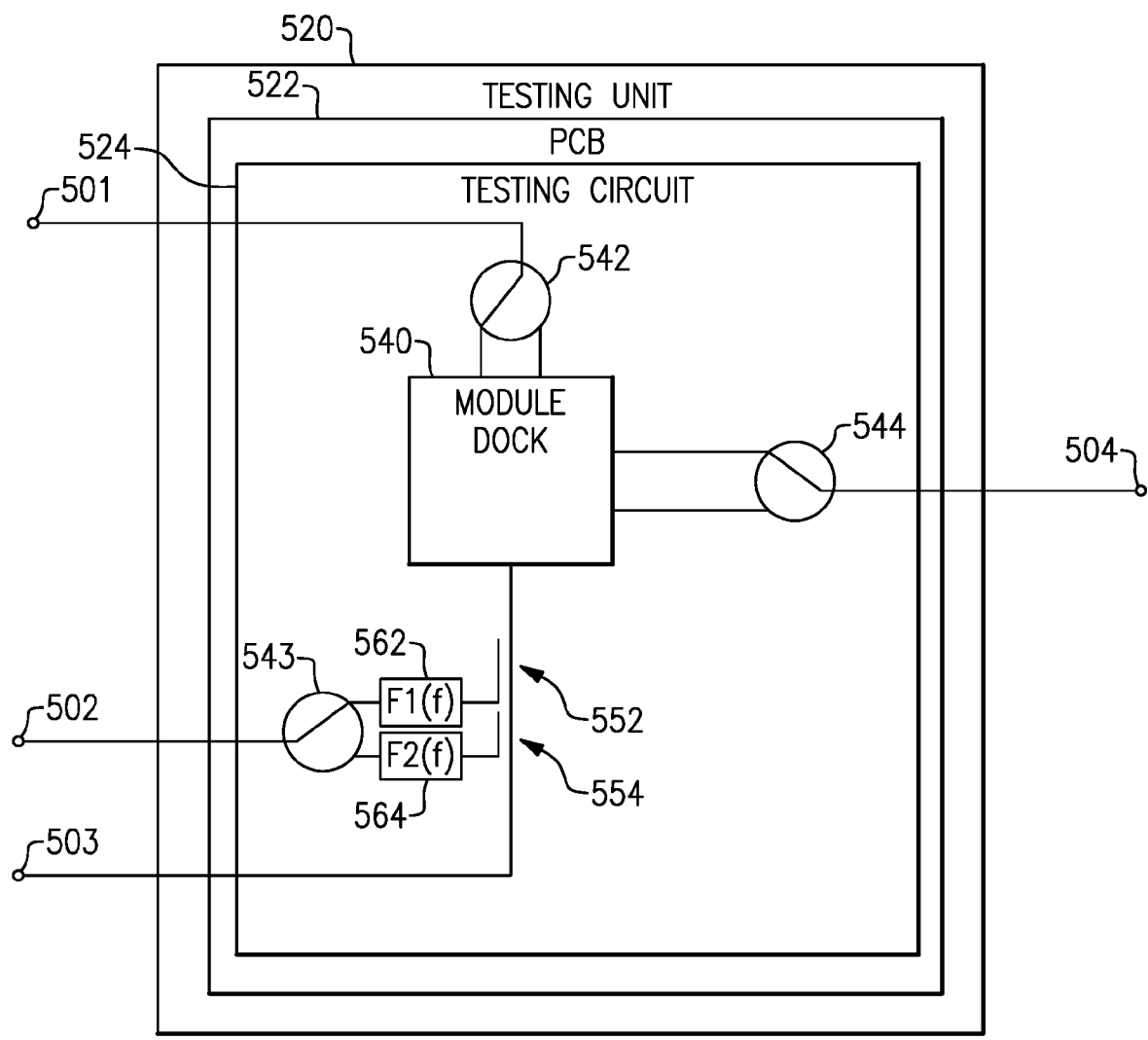
FIG. 5 shows an example of a testing unit including a printed circuit board (PCB).

FIG. 5 shows an example of a testing unit 520 including a printed circuit board (PCB) 522. The testing unit 520 includes a PCB 522 and a testing circuit 524 implemented on the PCB 522. The testing circuit 524 may be implemented on the PCB 522 through the use of conductive traces and SMT (surface-mount technology) components.

The testing unit 520 includes a testing unit input 501 for receiving a testing unit input signal, e.g., from a processing module. The testing unit 520 further includes a testing unit fundamental output 503 for providing a testing unit fundamental output signal and a testing unit harmonic output 502 for providing a testing unit harmonic output signal. In general, the testing unit fundamental output signal includes the output signal of an RF module in response to the testing unit input signal and the testing unit harmonic output signal includes the harmonic component of the output signal of the RF module in response to the testing unit input signal.

The testing unit input 501 is coupled to a testing circuit input of the testing circuit 524. Similarly, the testing unit fundamental output 503 is coupled to a testing circuit fundamental output and the testing unit harmonic output 502 is coupled to a testing circuit harmonic output.

The testing circuit 540 includes a module dock 540 configured to receive an RF module to be tested. The module dock includes a variety of leads that are coupled to corresponding leads of the RF module when the RF module is inserted into the module dock 540 or otherwise coupled to the module dock 540.

The testing circuit 524 includes a number of switches 542-544 that can be configured to test the RF module in a first mode (e.g., for amplifying a GSM signal) or a second mode (e.g., for amplifying a DCS signal). The switches 542-544 may be solid state switches. For example, the switches may include one or more transistors. The state of the switches 542-544 may be controlled via other testing unit inputs (not shown) by a processing module of a testing system, such as the processing module 230 of the testing system 210 of FIG. 2.

The testing circuit 524 includes a first switch 542 having a switching input, a first switching output, and a second switching output. The first switch 542 may be configured to couple the switching input to the first switching output or the second switching output. The first switching output may be coupled to a first transmission signal input of the module dock 540 so as to be coupled to a first transmission input (e.g., a GSM transmission input) of the RF module when inserted. The second switching output may be coupled to a second transmission signal input of the module dock 540 so as to be coupled to a second transmission input (e.g., a DCS transmission input) of the RF module when inserted.

The testing circuit 524 includes an output trace that couples the testing unit fundamental output 503 to the module dock 540 so as to be coupled to an output of the RF module when inserted. Portions of the output trace make up two directional couplers 552, 554 disposed between the testing unit fundamental output and the module dock 540. A first directional coupler 552 includes a first portion of the output trace and a portion of a first coupling trace. A second directional coupler 554 includes a second portion of the output trace and a portion of a second coupling trace. In one embodiment, as shown in FIG. 5, the first coupling trace and second coupling trace are disposed on the same side of the output trace. In one embodiment, the first coupling trace and second coupling trace are disposed on opposite sides of the same portion of the output trace. The portion of the first coupling trace may be dimensioned so as to couple harmonics of a GSM output signal. For example, the portion of the first coupling trace may be approximately 700 mm (millimeters) so as to couple frequencies between approximately 1.7 GHz (gigahertz) and 6.3 GHz. The portion of the second coupling trace may be dimensioned so as to couple harmonics of a DCS output signal. For example, the portion of the second coupling trace may be approximately 281 mm so as to couple frequencies between approximately 3.15 GHz and 7.55 GHz.

The first coupling trace is connected to a first filter 562 that is configured to bandpass filter a signal over a first frequency range (e.g., to bandpass filter the harmonic component of a GSM output signal). The second coupling trace is connected to a second filter 564 that is configured to bandpass filter a signal over a second frequency range (e.g., to bandpass filter the harmonic component of a DCS output signal).

The ends of the coupling traces not connected to the filters may be coupled, via a resistor (not shown), to a ground voltage. The resistor may be, for example, approximately 50 ohms. The testing circuit 524 may include an RF attenuator (not shown) disposed between the directional couplers 552, 554 and the testing unit fundamental output 503.

The testing circuit 524 includes a second switch 543 having a first switching input, a second switching input, and a switching output. The second switch 542 may be configured to couple the first switching input or the second switching input to the switching output. The first switching input may be coupled to the first filter 562 and the second switching input may be coupled to the second filter 564. The switching output may be coupled to the testing unit harmonic output 502.

The testing circuit 524 includes a third switch 544 having a first switching input, a second switching input, and a switching output. The third switch 544 may be configured to couple the first switching input or the second switching input to the switching output. The switching output may be coupled to an insertion loss output 504 of the testing unit. The first switching input may be coupled to the module dock 540 so as to be coupled to a first reception output (e.g., a GSM reception output) of the RF module when inserted. The second switching input may be coupled to the module dock 540 so as to be coupled to a second reception output (e.g., DCS reception output) of the RF module when inserted.

As described above, the RF module may, in response to an input transmission signal, produce an output transmission signal. This response may be measured by applying a testing unit input signal at the testing unit input 501 and measuring the testing unit fundamental output signal and testing unit harmonic output signal at their respective outputs 503, 502. Relatedly, the RF module, in response to an input reception signal, produces an output reception signal. This response may be measured by applying an insertion loss test signal at the testing unit fundamental output 503 and measuring an insertion loss output signal at the insertion loss output 504.

Figure 6:
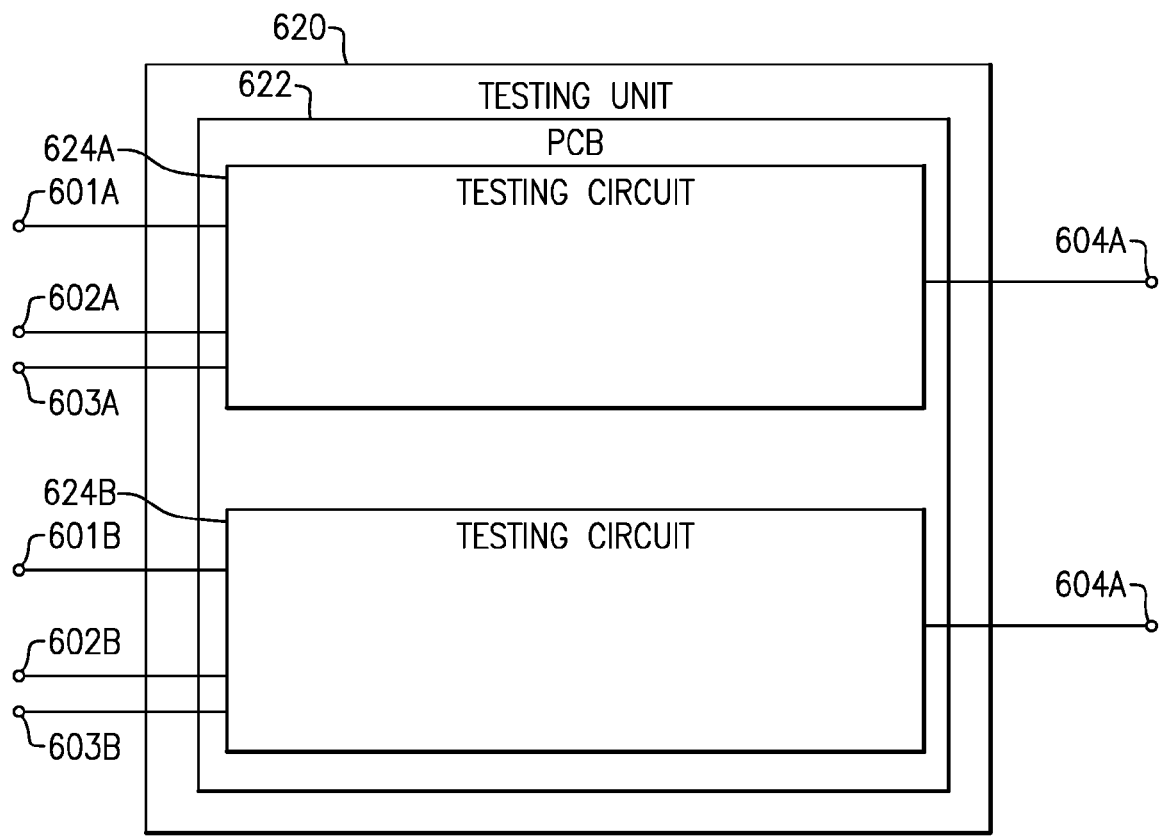
FIG. 6 shows a testing unit including multiple testing circuits.

FIG. 6 shows a testing unit 620 including multiple testing circuits 624A-624B. The testing unit 620 includes a PCB 622. The testing unit 620 includes a first testing circuit 624A implemented on the PCB 622 and a second testing circuit 624B implemented on the PCB 622. Each of the first testing circuit 624A and second testing circuit 624A may be implemented as the testing circuit 524 of FIG. 5 or any other testing circuit. The testing unit 620 may include two testing unit inputs 601A-601B, two testing unit fundamental outputs 603A-603B, two testing unit harmonic outputs 602A-602B, and two insertion loss outputs 604A-604B. The testing unit inputs and testing unit outputs may include ports for connecting cables to the testing unit 624. Thus, multiple RF modules may be tested using the same testing unit 620 at the same time, sequentially, or overlapping in time.

Although FIG. 6 shows a testing unit 620 with two testing circuits 624A-624B implemented on the PCB 622 of the testing unit 620, it is to be appreciated that, in various implementations, the testing unit 602 can include three or more testing circuits implemented on the PCB 622.

Figure 7:
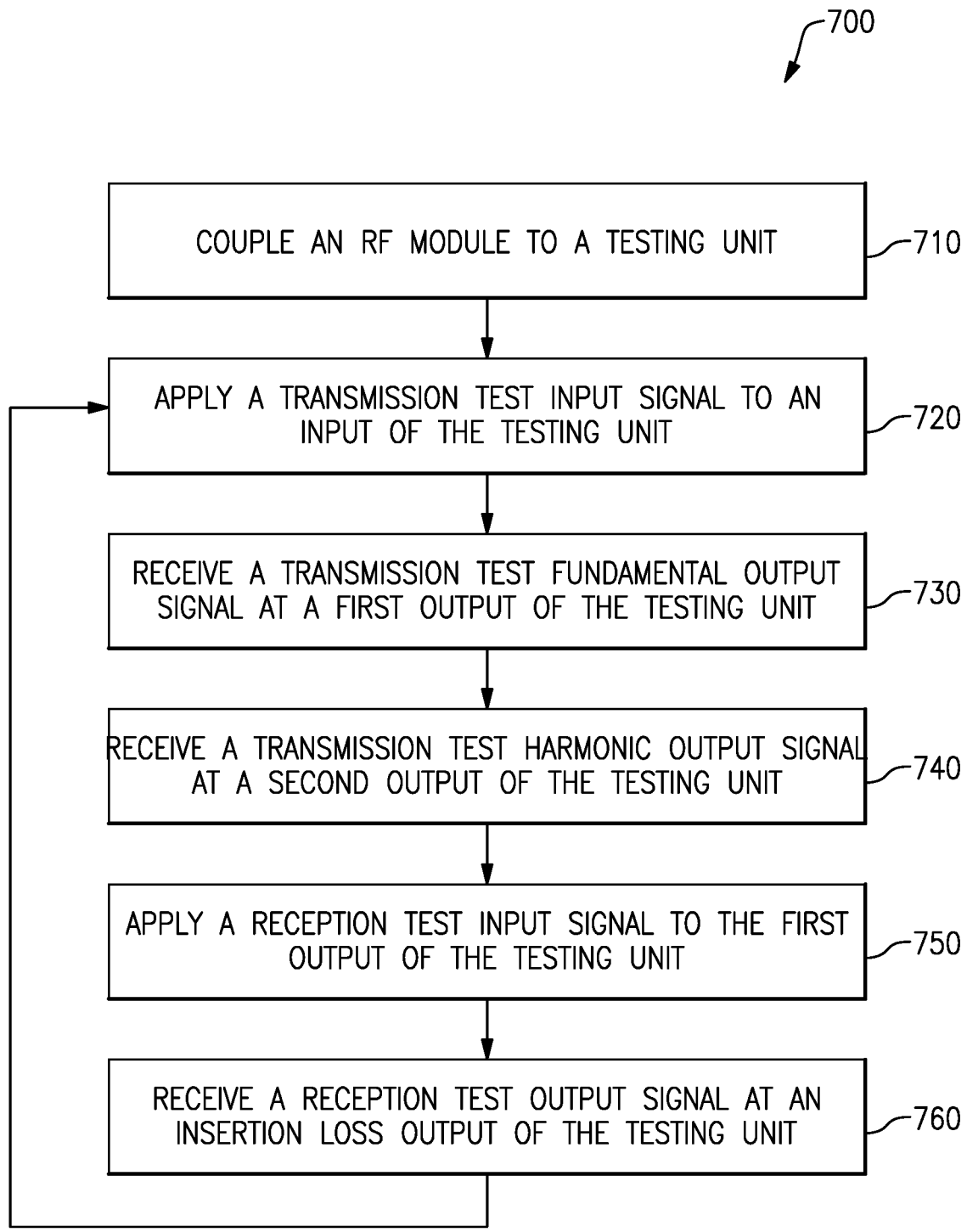
FIG. 7 shows a flowchart representation of a method of testing an RF module.

FIG. 7 shows a flowchart representation of a method 700 of testing an RF module. In some implementations (and as detailed below as an example), the method 700 is at least partially performed by a processing module, such as the processing module 230 of FIG. 2. In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, the method 700 includes coupling an RF module to a testing unit and applying various inputs to and receiving various outputs from the testing unit.

The method 700 begins, at block 710, with the coupling of an RF module to a testing unit. The RF module may be coupled to the testing unit by disposing the RF module into a dock of the testing unit. In particular, the RF module may be coupled to the testing unit by inserting the RF module into a dock of the testing unit. Coupling the RF module to the testing unit may include coupling various leads of the RF module to corresponding leads of the testing unit, e.g., corresponding leads of a dock of the testing unit.

At block 720, the processing module applies a transmission test input signal to an input of the testing unit. The transmission test input signal may be, for example, a GSM signal or a DCS signal. Applying the transmission test input signal to an input of the testing unit may also include configuring the testing unit to route the transmission test input signal to an appropriate input of the RF module. For example, applying the transmission test input signal to an input of the testing unit may include applying a GSM signal and setting a state of a switch to route the GSM signal to a GSM transmission input of the RF module.

At block 730, the processing module receives a transmission test fundamental output signal at a first output of the testing unit. The transmission test fundamental output signal may correspond to the signal produced by the RF module to be transmitted via an antenna in response to the transmission test input signal.

At block 740, the processing module receives a transmission test harmonic output signal at a second output of the testing unit. The transmission test harmonic output signal may correspond to a harmonic component of the signal produced by the RF module in response to the transmission test input signal. The transmission test harmonic output signal may be received via a directional coupler of the testing unit. The transmission test harmonic output signal may be received via a filter of testing unit. Receiving the transmission test harmonic output signal may include setting a state of a switch to receive a signal from one of a plurality of directional couplers corresponding to different signal types. For example, when a GSM signal is applied to the input of the testing unit, the state of a switch may be set to route the transmission test harmonic output signal from a directional coupler corresponding to GSM harmonics.

Although blocks 730 and 740 are described sequentially, it is to be appreciated that the steps of blocks 730 and 740 may be performed simultaneously or overlapping in time.

At block 750, the processing module applies a reception test input signal to the first output of the testing unit. The reception test input signal may be, for example, a GSM signal or a DCS signal. At block 760, the processing module receives a reception test output signal at an insertion loss output of the testing unit. The reception test output signal may correspond to the signal produced by the RF module upon receiving the reception test input signal via an antenna.

The method 700 may return to block 720 for testing of another signal type. Thus, the method 700 may be performed for a GSM signal and a DCS signal using the same testing unit. Further, the method 700 may be performed for multiple frequencies using the same testing unit.

Figure 8:
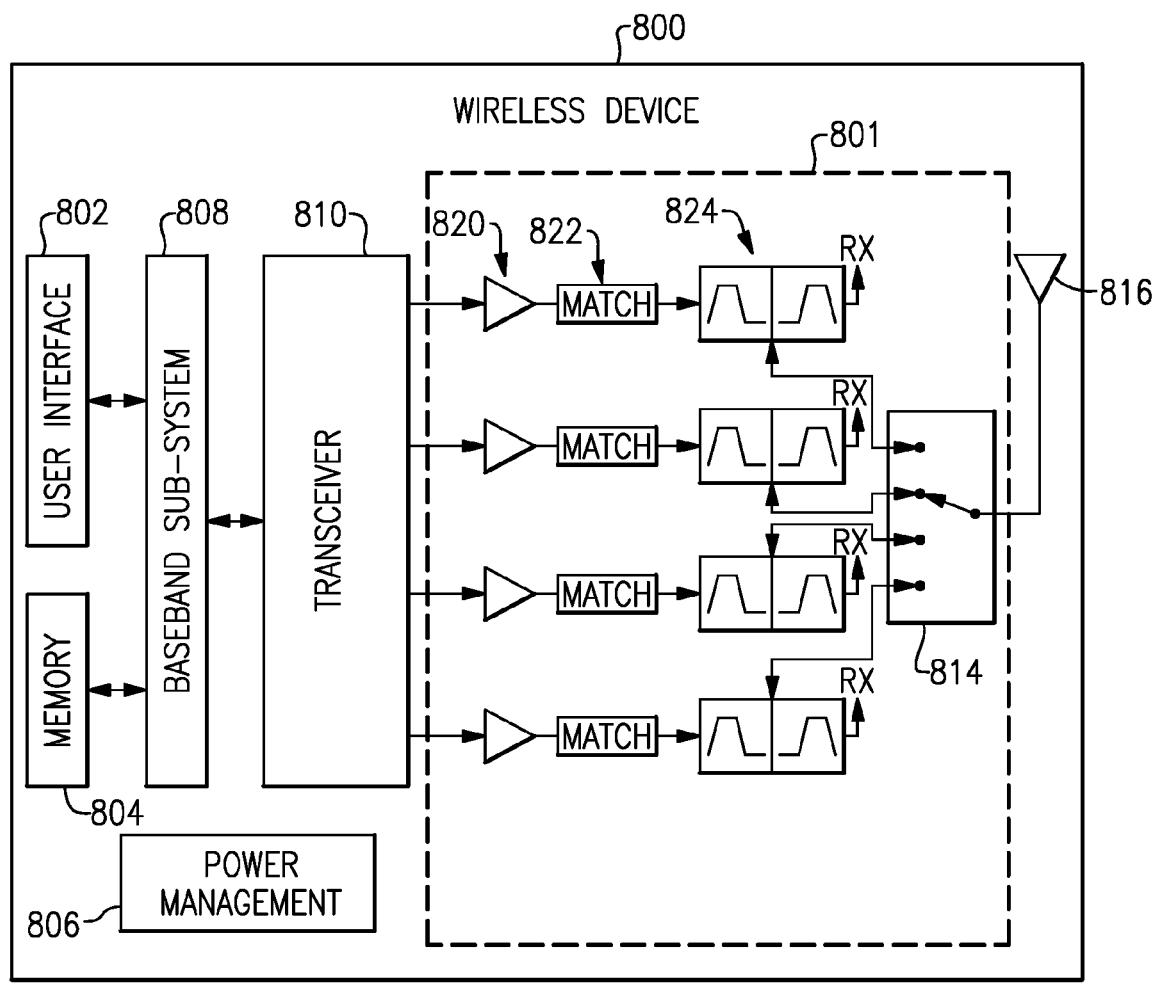
FIG. 8 shows an example wireless device including a module that may be tested using the aspects described herein.

FIG. 8 depicts an example wireless device 800 including a module 801 that may be tested using the aspects described herein. Such a module can be generally depicted by a dashed box 801, and can be implemented as, for example, a front-end module (FEM).

Referring to FIG. 8, power amplifiers (PAs) 820 can receive their respective RF signals from a transceiver 810 that can be configured and operated in known manners to generate RF signals to be amplified and transmitted, and to process received signals. The transceiver 810 is shown to interact with a baseband sub-system 808 that is configured to provide conversion between data and/or voice signals suitable for a user and RF signals suitable for the transceiver 810. The transceiver 810 can also be in communication with a power management component 806 that is configured to manage power for the operation of the wireless device 800. Such power management can also control operations of the baseband sub-system 808 and the module 801.

The baseband sub-system 808 is shown to be connected to a user interface 802 to facilitate various input and output of voice and/or data provided to and received from the user. The baseband sub-system 808 can also be connected to a memory 804 that is configured to store data and/or instructions to facilitate the operation of the wireless device, and/or to provide storage of information for the user.

In the example wireless device 800, outputs of the PAs 820 are shown to be matched (via respective match circuits 822) and routed to their respective duplexers 824. Such amplified and filtered signals can be routed to an antenna 816 through an antenna switch 814 for transmission. In some embodiments, the duplexers 824 can allow transmit and receive operations to be performed simultaneously using a common antenna (e.g., 816). In FIG. 8, received signals are shown to be routed to "Rx" paths (not shown) that can include, for example, a low-noise amplifier (LNA).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS (Global Positioning System).

The module 801 may be tested using the aspects described herein wherein the output from the transceiver 810 corresponds to the transmission test input signal, the output to the antenna 816 corresponds to the transmission test fundamental output signal, the input from the antenna 816 corresponds to the reception test input signal, and the output from the "Rx" path corresponds to the reception test output signal.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A testing circuit comprising:
   a testing circuit input configured to receive an output signal from a module, the output signal having a fundamental component and a harmonic component;
   a testing circuit fundamental output configured to output the fundamental component;
   a testing circuit harmonic output configured to output the harmonic component;
   an insertion loss output configured to output an insertion loss output signal in response to an insertion loss input applied to the testing circuit fundamental output; and
   a first directional coupler having a first coupler input coupled to the testing circuit input, a first transmitted output coupled to the testing circuit fundamental output, and a first coupled output coupled to the testing circuit harmonic output.

2. The testing circuit of claim 1 further comprising a first filter coupled between the first coupled output and the testing circuit harmonic output, the first filter configured to bandpass filter the harmonic component for a first type of the output signal.

3. The testing circuit of claim 2 wherein the first type of the output signal is a GSM (Global System for Mobile Communications) signal.

4. The testing circuit of claim 1 further comprising a second directional coupler having a second coupler input coupled to the testing circuit input, a second transmitted output coupled to the testing circuit fundamental output, and a second coupled output coupled to the testing circuit harmonic output.

5. The testing circuit of claim 4 further comprising a switch having a first switching input coupled to the first coupled output, a second switching input coupled to the second coupled output, and a switching output coupled to the testing circuit harmonic output.

6. The testing circuit of claim 4 further comprising a second filter coupled between the second coupled output and the testing circuit harmonic output, the second filter configured to bandpass filter the harmonic component for a second type of the output signal.

7. The testing circuit of claim 6 wherein the second type of the output signal is a DCS (Digital Cellular Service) signal.

8. The testing circuit of claim 1 wherein the first directional coupler includes a portion of a first trace and a portion of second trace, the first trace coupling the testing circuit input to the testing circuit fundamental output and the portion of the second trace being disposed adjacent and parallel to the portion of the first trace.

9. The testing circuit of claim 8 wherein the first trace and the second trace are disposed on a printed circuit board.

10. The testing circuit of claim 1 further comprising a first transmission signal input configured to provide a first transmission input signal to a first transmission input of the module.

11. The testing circuit of claim 10 further comprising a second transmission signal input configured to provide a second transmission input signal to a second transmission input of the module.

12. The testing circuit of claim 11 further comprising a switch having a first switching output coupled to the first transmission signal input and a second switching output coupled to the second transmission signal input.

13. A testing unit comprising:
   a printed circuit board;
   a testing circuit implemented on the printed circuit board, the testing circuit including a testing circuit input configured to receive an output signal from a radio-frequency (RF) module, the output signal having a fundamental component and a harmonic component, a testing circuit fundamental output configured to output the fundamental component, a testing circuit harmonic output configured to output the harmonic component, an insertion loss output configured to output an insertion loss output signal in response to an insertion loss input applied to the testing circuit fundamental output, and a first directional coupler having a first coupler input coupled to the testing circuit input, a first transmitted output coupled to the testing circuit fundamental output, and a first coupled output coupled to the testing circuit harmonic output.

14. The testing unit of claim 13 wherein the RF module is a front-end module (FEM).

15. The testing unit of claim 13 wherein the testing circuit further includes a second directional coupler having a second coupled input coupled to the testing circuit input, a second transmitted output coupled to the testing circuit fundamental output, and a second coupled output coupled to the testing circuit harmonic output.

16. The testing unit of claim 13 further comprising a second testing circuit implemented on the PCB, the second testing circuit including a second testing circuit input configured to receive a second output signal from a second module, the second output signal having a second fundamental component and a second harmonic component, a second testing circuit fundamental output configured to output the second fundamental component, a second testing circuit harmonic output configured to output the second harmonic component, and a second directional coupler having a second coupler input coupled to the second testing circuit input, a second transmitted output coupled to the second testing circuit fundamental output, and a second coupled output coupled to the second circuit harmonic output.

17. The testing unit of claim 13 wherein the first directional coupler includes a portion of a first trace and a portion of second trace, the first trace coupling the testing circuit input to the testing circuit fundamental output and the portion of the second trace being disposed adjacent and parallel to the portion of the first trace.

18. A method of testing a radio-frequency (RF) module, the method comprising:
   coupling the RF module to a testing unit;

applying a transmission test input signal to an input of the testing unit;
receiving a transmission test fundamental output signal at a first output of the testing unit;
receiving a transmission test harmonic output signal from a second output of the testing unit via a directional coupler of the testing unit;
applying a reception test input signal to the first output of the testing unit; and
receiving a reception test output signal from an insertion loss output of the testing unit.

19. The method of claim 18 further comprising applying a second transmission test input signal to the input of the testing unit, the transmission test input signal being a GSM signal and the second transmission test input signal being a DCS signal.

20. The method of claim 18 wherein receiving the transmission test harmonic output signal comprises setting a state of a switch to receive a signal from one of a plurality of directional couplers corresponding to different signal types.

* * * * *